United States Patent
Frenger et al.

(12) 
(10) Patent No.: US 8,009,581 B2
(45) Date of Patent: Aug. 30, 2011

(54) METHOD IN A SCHEDULER FOR REDUCING INTER-CELL INTERFERENCE

(75) Inventors: Pål Frenger, Linköping (SE); Gabor Fodor, Hässelby (SE); Jessica Heyman, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 199 days.

(21) Appl. No.: 12/304,423

(22) PCT Filed: Nov. 2, 2006

(86) PCT No.: PCT/SE2006/050451
§ 371 (c)(1),
(2), (4) Date: Dec. 11, 2008

(87) PCT Pub. No.: WO2007/145557
PCT Pub. Date: Dec. 21, 2007

(65) Prior Publication Data
US 2009/0196193 A1 Aug. 6, 2009

(30) Foreign Application Priority Data
Jun. 12, 2006 (SE) ........................................ 0601296

(51) Int. Cl.
*H04J 1/16* (2006.01)
*H04L 12/56* (2006.01)

(52) U.S. Cl. .......................... 370/252; 370/230; 370/329
(58) Field of Classification Search .................. 370/328, 370/329, 252, 230
See application file for complete search history.

(56) References Cited

U.S. PATENT DOCUMENTS

| | | | | |
|---|---|---|---|---|
| 5,818,824 A | * | 10/1998 | Lu et al. | 370/328 |
| 7,372,842 B2 | * | 5/2008 | Kim et al. | 370/345 |
| 7,626,989 B2 | | 12/2009 | Raitola et al. | |
| 7,895,273 B1 | * | 2/2011 | Haldar | 709/206 |

FOREIGN PATENT DOCUMENTS

WO WO 2005/046283 A1 5/2005

* cited by examiner

*Primary Examiner* — John Pezzlo

(57) ABSTRACT

The present invention relates to a method for reducing inter-cell interference in a cellular radio system in which said scheduler controls a set of shared radio resources. The method comprises the steps of—assigning cell specific resource priority weights (RPW) to the different radio resources of a cell, said assignment differs from the assignment of the same radio resources in at least one neighboring cell utilizing the resource priority weights for selection of radio resources. The resource priority weights can furthermore be combined with channel quality indication reports (CQI) to form weighted quality indexes (WCQI) for the radio resources that are available to the scheduler. The invention also relates to a scheduler performing said method and a radio network node comprising such scheduler.

34 Claims, 3 Drawing Sheets

METHOD IN A SCHEDULER FOR REDUCING INTER-CELL INTERFERENCE

FIELD OF THE INVENTION

The present invention relates to methods and arrangements in cellular mobile communication systems, in particular to the inter-cell interference management in cells.

BACKGROUND

In cellular radio systems it is desirable to achieve high data rates for users also at the cell edges that typically have poor radio conditions. Traditionally, radio resources are therefore divided into different sets that are assigned to neighboring cells to make it possible to reduce the interference level for the cell edge users, thus allowing them to communicate with higher data rates, but at the cost of a reduced cell capacity. Other, more advanced methods like soft frequency reuse (sometimes also referred to as power planning) in OFDM systems or fractional frequency reuse also aim to provide users at the cell edges with higher data rates. These methods provide good ways of controlling the trade-off between cell edge data rate and cell capacity.

Previous solutions to provide high data rates to users at cell edges suffer from the disadvantage that they imply a trade-off between cell edge data rate and cell capacity. Furthermore, in many packet data systems where packets of different sizes originating from different sources, e.g. Voice over IP, web traffic etc, are transmitted from different locations in the cells in each transmission time interval, the traffic load varies significantly in both the spatial and temporal domains. The traffic variation is independent between the different cells, and the time scale of the load variations is such that the transmissions from different cells cannot be successfully coordinated.

It can thus be concluded that static resource division methods and interference coordination methods that do not take into account and utilize the traffic variations only have a limited potential.

SUMMARY

It is therefore an object of the present invention to avoid this trade-off and instead improve the data rate that is available to users at the cell edge while at the same time maintaining the cell capacity as for a system where all radio resources can be used (i.e. a reuse-1 system). Furthermore, it is an object of the invention to make the inter-cell interference more predictable and thereby allowing the link adaptation to be more exact.

The present invention relates to a method for reducing inter-cell interference and a scheduler performing said method. More specifically, the invention relates to a method in a scheduler for reducing inter-cell interference in a cellular radio system in which said scheduler (111) controls a set of shared radio resources. The method comprises the steps of assigning cell specific resource priority weights (RPW) to the different radio resources available in a cell (11), said assignment differs from the assignment of the same radio resources in at least one neighboring cell, and thereafter utilizing the resource priority weights for selection of radio resources. Hence, the same radio resources will not primarily be selected by a scheduler of a neighboring cell, thus avoiding inter-cell interference.

The resource priority weights are cell specific since the same resource will be assigned different weights in the respective schedulers of the neighboring cells. The present invention thus provides the advantage that sufficiently high data rates are available to users at the cell edge while at the same time the cell capacity can be maintained as for a system where all available radio resources can be used.

The aspect of the invention described above also implies the advantage that the inter-cell interference becomes more predictable and, when the cell is not fully loaded, can be concentrated to some specific radio resources.

It is another advantage of the present invention that the probability that the same radio resources are selected in neighboring cells is significantly reduced, while avoiding at the same time the cell capacity loss that is associated with traditional frequency reuse schemes.

The invention is equally applicable to transmission in both uplink and downlink. In case of uplink transmission the scheduler aims to assign resources with high resource priority weights to cell edge-users.

The invention furthermore relates to a scheduler controlling a set of shared resources in a cellular radio system, comprising means for performing the method according to the invention.

The invention furthermore relates to a radio network node in a cellular radio system comprising a scheduler, where said scheduler comprises means for performing the method according to the invention.

In one embodiment of the invention, the cell specific resource priority weights are combined with channel quality indication reports, CQI, from the users to form weighted quality indexes, WCQI, for the radio resources that are available to the scheduler. Hereby, the channel quality variations between different users are taken into account and a scheduling gain is achieved.

In yet another embodiment of the invention, the cell specific resource priority weights and/or the weighted quality index is/are combined with one or more usage limitation rules, which may be cell specific and/or user specific and/or resource specific and/or time dependent. Hereby, it is possible to further define which resources that may be used by which users under different conditions.

BRIEF DESCRIPTION OF THE DRAWINGS

The foregoing and other objects, features and advantages of the invention will be apparent from the following detailed description of preferred embodiments as illustrated in the drawings.

DESCRIPTION

Figure 1:
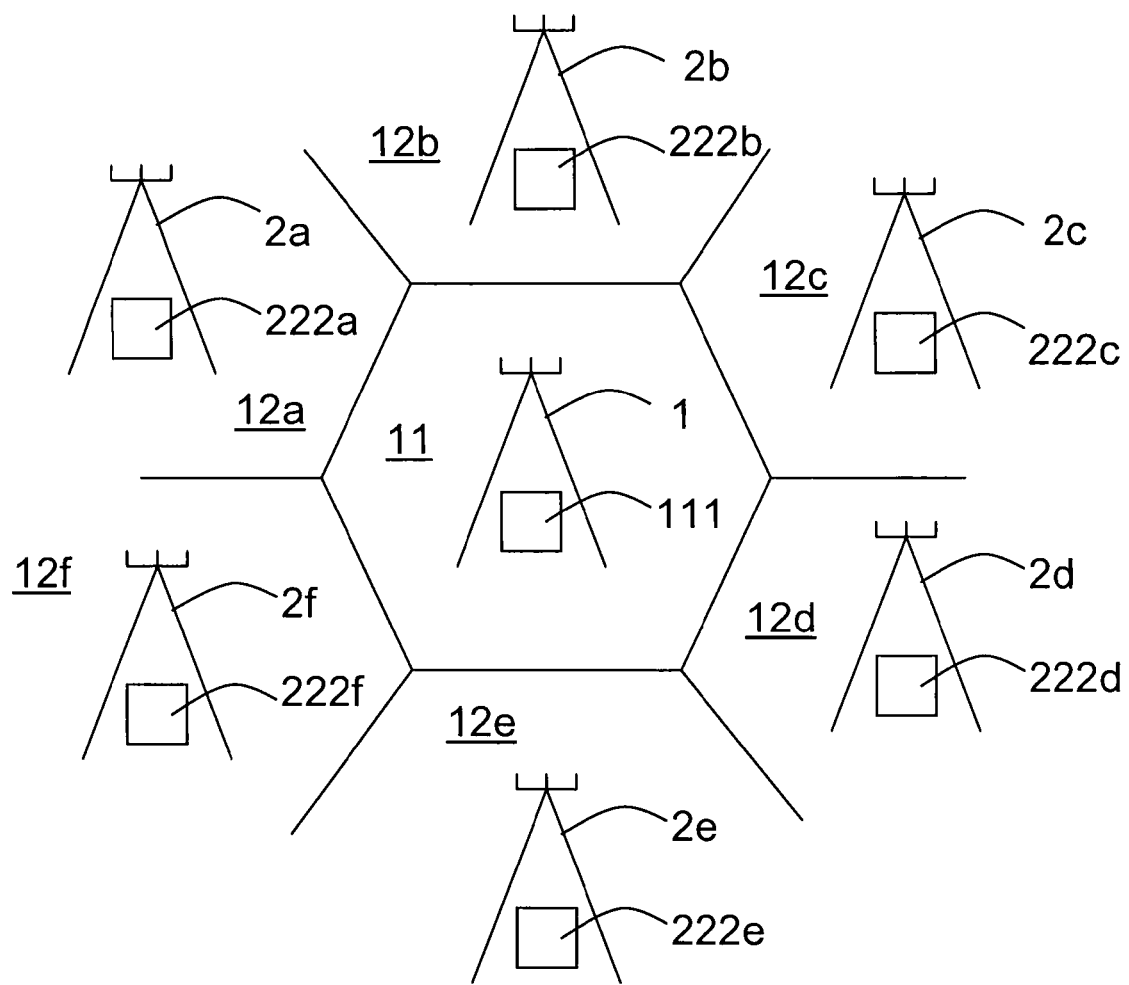
FIG. 1 illustrates a cellular radio network comprising network units according to the claimed invention.

The present invention relates to cellular radio systems as shown in FIG. 1. The base station 1 is provided with a scheduler 111 which owns and controls a set of shared radio resources of cell 11. The radio resources of neighboring cells 12a-f are owned and controlled by their respective schedulers 222a-f. The radio resources may comprise of sets of sub-carriers in an OFDM system, time slots in a TDMA system, or spreading codes in a CDMA system. Further, the respective set of radio resources shall be orthogonal, or near orthogonal, to each other. It is also noted that the benefits of the present invention can be advantageously used when the traffic load in communication system varies significantly in both the spatial and temporal domains. This is a typical behavior in many packet data systems where packets of different sizes originating from different sources, e.g. VOIP, web traffic etc. are transmitted from different locations in the cells in each transmission time interval, TTI. Hereby it is assumed that the traffic variation are independent between the different cells in the system and that the time scale of the load variations is such that we can not successfully coordinate the transmissions from different cells, e.g. by means of a joint scheduling decision in a centralized node or by some distributed scheduling algorithm.

Figure 2:
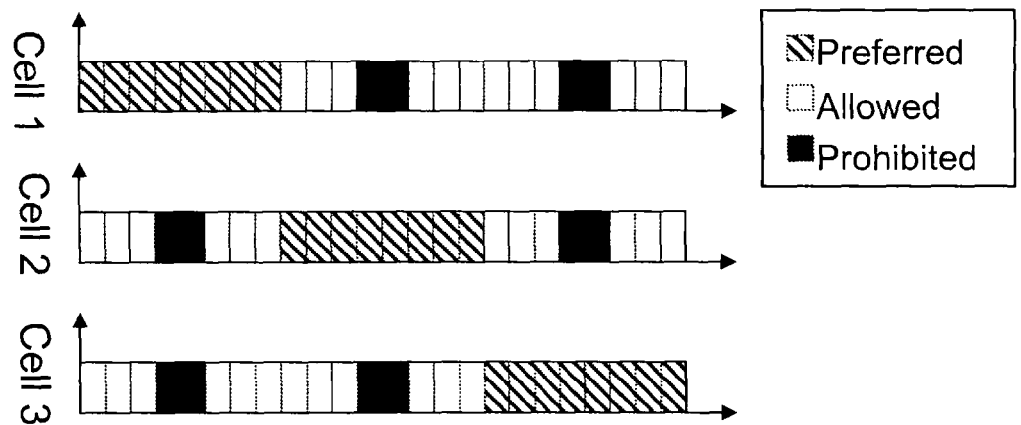
FIG. 2 illustrates an embodiment of the invention, where resources in three cells are categorized into three priority classes.

The present invention exploits gains with schemes that adapt to the user traffic in some way. One such scheme is to have an underlying reuse-3 cell planning of preferred resources assigned to each cell. All cells will first use all their preferred resources before any other allowed resources. Only when one cell has a lot of data it will use all allowed resources. It is also possible to have some resources that are prohibited, as in traditional reuse schemes. By this resource division (preferred, allowed, and possibly also not-allowed resources) the average cell edge SINR (Signal to Interference plus Noise Ratio) can be improved, at low and moderate load at least, while the bandwidth cost of a re-use larger than one is avoided. This is illustrated in FIG. 2 showing an example with three cells where resources are categorized as preferred, allowed, and prohibited by assigning separate priority class indexes to the resources, one for each category. The priority class index expresses the order of priority that can be applied to the resources as integers in an indexing vector. Although the example in FIG. 2 shows the set of resources as a continuous set, they may also be distributed. Said resource division makes the interference more predictable, thus allowing the link adaptation to be more exact and aggressive.

Figure 3:
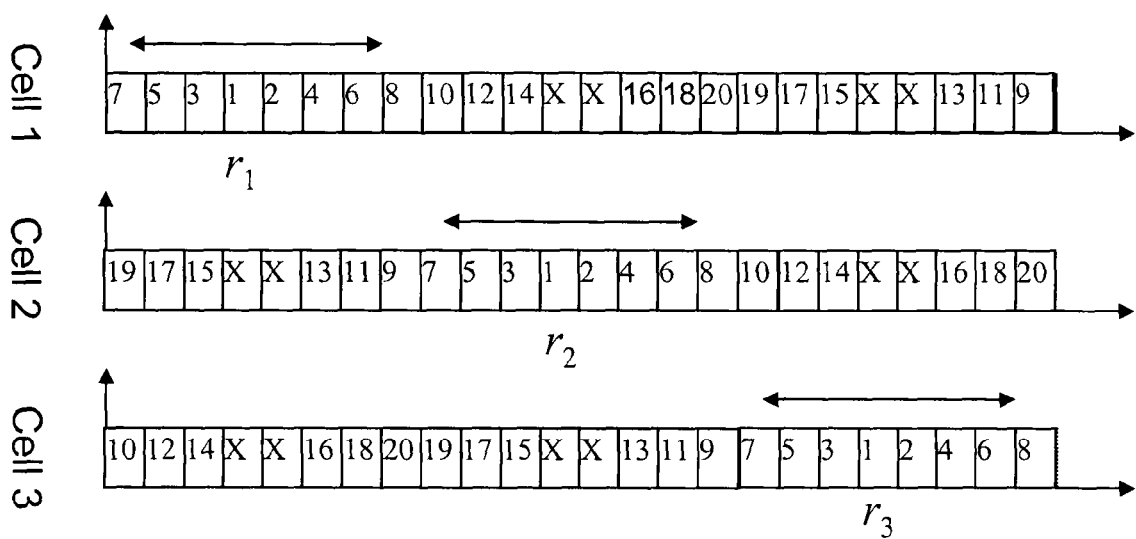
FIG. 3 illustrates another embodiment of the invention, where resources in three cells are prioritized according to a priority list.

In a further embodiment of the present invention a priority list is introduced covering each resource in the scheduler, whereby the scheduler always selects the resources with the highest priority. One way of creating appropriate resource priority lists for the schedulers is to assign each scheduler with a starting resource $r_0$, $r_1$, $r_2$ for the schedulers in cell 0, cell 1, and cell 2 respectively and then selecting resources in both directions when they are needed. In such a priority list, each available resource is assigned different priority class indexes where the lowest priority class index is assigned to the starting resource and the subsequently following resources are assigned raising indexes. This is illustrated in FIG. 3 showing an example with three cells where the resources are prioritized in order to minimize the inter-cell interference. The resources in a cell i are selected by starting with a resource $r_i$ and then using as many resources as needed from both sides of $r_i$ according to the principle of $r_i$, $r_i-1$, $r_i+1$, $r_i-2$, $r_i+2$, ... or equivalently, $r_i$, $r_i+1$, $r_i-1$, $r_i+2$, $r_i-2$, ... Not allowed resources are marked in the figure with x. The numbering in the different boxes indicates the priority class indexes, i.e. the order in which the resources will be utilized in the different cells.

In the examples described above, the priority class index (PCI) is associated with a one-to-one mapping to the cell specific resource priority weight (RPW). The resources with the lowest priority class index, i.e. the resources to be used first, will be assigned the highest resource priority weights. The resource with the highest priority class index, i.e. the resources to be used only when all other resources are already occupied, will be assigned the smallest resource priority weight. The priority class index thus indicates the priority order of the resources. The RPW of a resource with index r in the cell with index c may typically be calculated as $$RPW(c,r)=K1-K2\times PCI(c,r),$$

where K1 and K2 are constant values. Alternatively a table can be designed where each priority class index is associated with a corresponding priority class weight.

The resource division as described in the foregoing implies however a reduced scheduling gain since in each cell it is only allowed to select the best resources from the set of preferred resources, while there are still such resources available, and not from all resources. There is thus a trade-off between inter-cell interference levels and predictability versus the single user scheduling gain that can be obtained from having each user transmitting only on the resources with the best quality. These two principles can be combined by adding channel quality indication (CQI) reports from each user to the cell specific resource priority weights (RPW) into a weighted channel quality index (WCQI) as follows:

$$WCQI(c,u,r)=CQI(u,r)+RPW(c,r)$$

In the above expression c denotes the cell index, u denotes the user index, and r denotes the resource index. It is assumed that the CQI values are limited to the range $[0, CQI_{max}]$ and that resources with a WCQI below zero (or some other predefined threshold value) are not allowed to be used by the scheduler.

As previously mentioned, the resources can be partitioned into classes represented by the priority class indexes. A scaled value of RPW can furthermore be calculated as e.g., $RPW(c,r)=(PCI_{max}-PCI(c,r))\times\Delta$ to the resources with index r belonging to the corresponding priority classes in the cell c, where $\Delta$ is a constant value representing a scaling factor and $PCI_{max}$ is the maximum value of a PCI. By setting $\Delta$ to $(CQI_{max}+1)$ or larger it can be assured that all resources of a class with a lower priority class index are used before starting to use any resources having a higher priority class index. Setting $\Delta$ to $CQI_{max}$ or smaller allows the scheduler to sometimes use a resource with a higher priority class if the channel quality indicator of the corresponding higher-priority-class index resource is sufficiently large.

With reference to FIG. 2 we may set $\Delta=(CQI_{max}+1)$ and the priority class index to 0, 1, and −1 for the respective priority classes denoted preferred, allowed, and prohibited in FIG. 2. In this example $PCI_{max}=1$ and the resulting resource priority weights will then become $(CQI_{max}+1)$, 0, and $-(CQI_{max}+1)$ for the resources denoted preferred, allowed, and prohibited respectively.

In FIG. 3 there is only one resource in each priority class. The resource priority indexes in FIG. 3 may thus be used to calculate the resource priority weights as $RPW(c,r)=(PCI_{max}-PCI(c,r))\times\Delta$, with $PCI_{max}=20$ and $PCI(c,r)$ is given by the numbers in the figure, i.e. in accordance to what was previously described by the resource ordering ($r_c$, $r_c-1$, $r_c+1$, $r_c-2$, $r_c+2$, ... ), for each cell c=1, 2, and 3. Resources marked with an X in FIG. 3 will be assigned a resource priority weight of $-(CQI_{max}+1)$ to ensure that the weighted CQI (WCQI) is always a negative value regardless of the CQI value.

It is thus possible to scale the impact that the RPW and the CQI respectively will have in the calculation of the weighted channel quality index (WCQI).

A further aspect of the invention introduces the possibility to use or not to use the resources of some priority classes under certain conditions. The following is a non-comprehensive list of possible restrictions:

1. Resources with higher resource priority indexes may not be used before any resources with lower priority indexes. This can also be achieved by setting the parameters of the RPW calculation properly.

2. Resources of certain priority classes may not be used unless the buffer fill ratio is above a threshold (different priority classes may have different thresholds).

3. Resources of certain priority classes may not be used unless the packet delay is above a threshold (different priority classes may have different thresholds).

4. Resources of certain priority classes may not be used unless the packet error rate (or some other packet quality measurement like the packet drop rate) is above a threshold.

5. If there is information available of the load in neighboring cells it is possible to restrict certain resources to be used only if the load measurements in the neighboring cells are all below (or above) a threshold.

6. A utilization restriction can be set to some resources, e.g. resources of a certain priority class may be used in a transmission time interval (TTI) only if the utilization of these resources is below a threshold. Utilization may, e.g., be measured as the time and frequency usage count of the resources of this priority class summarized over the previous N TTIs.

7. The resources in a specific priority class may only be used for $N_{max}$ consecutive TTIs.

8. If resources of some specific priority class are used in a transmission time interval TTI (n), then the same resource must not be used in $TTI(n+N_{RTT})$ where $N_{RTT}$ is related to the HARQ round-trip time. The reason for this could be to let through a retransmission from a user equipment that in its first transmission was interfered by a user equipment in a neighboring cell that rapidly increased its power, whereby the channel quality for the first UE was deteriorated between measurement and transmission.

Alternatively, when in a transmission time interval TTI(n) the transmitted power on resources of certain priority have increased more than a threshold over a pre-defined time interval, the same resources must not be used in transmission time interval number $(n+N_{RTT})$ where $N_{RTT}$ is related to the HARQ round-trip time.

9. Any of the restrictions disclosed in sections 2-8 can be combined with a timer. When the threshold is exceeded a timer is started indicating that it is allowed to use the corresponding resource until the timer expires (each priority class may have its own timer value).

10. Any of the restrictions disclosed in sections 2-8 can be combined with a hysteresis for the threshold values. Once the threshold is exceeded it is allowed to use the corresponding resources until the measurement falls below another threshold (typically lower than the first threshold).

11. The resources of some specific priority classes may only be used by users with a certain premium classification (PLATINUM/GOLD/SILVER) or any combination thereof or, assuming that there are such users, the resources may always be scheduled to such users first.

12. The resources of some specific priority classes may only be used by emergency calls or the resources are always scheduled first to emergency users if such users exist.

The above mentioned thresholds, hysteresis intervals, timers and restriction rules may be applied differently to resources of different priority classes.

The introduction of restrictions, e.g. as disclosed above, can be formalized by expanding the calculation of the WCQI values to also include a time varying restriction rule RR(c,u,r,t) as follows (t is the TTI index):

$$WCQI(c,u,r,t)=CQI(u,r,t)+RPW(c,r)+RR(c,u,r,t)$$

Whenever a certain resource is not allowed because of any combination of usage restrictions like the ones listed above, RR is set to a value less than $-(CQI_{max}+RPW_{max})$ which will assure that the corresponding WCQI value is below zero.

In further embodiments not described herein, additional factors covering aspects of the conditions in the own and neighboring cells other than those described herein could be added in the calculation of the WCQI value.

Figure 4:
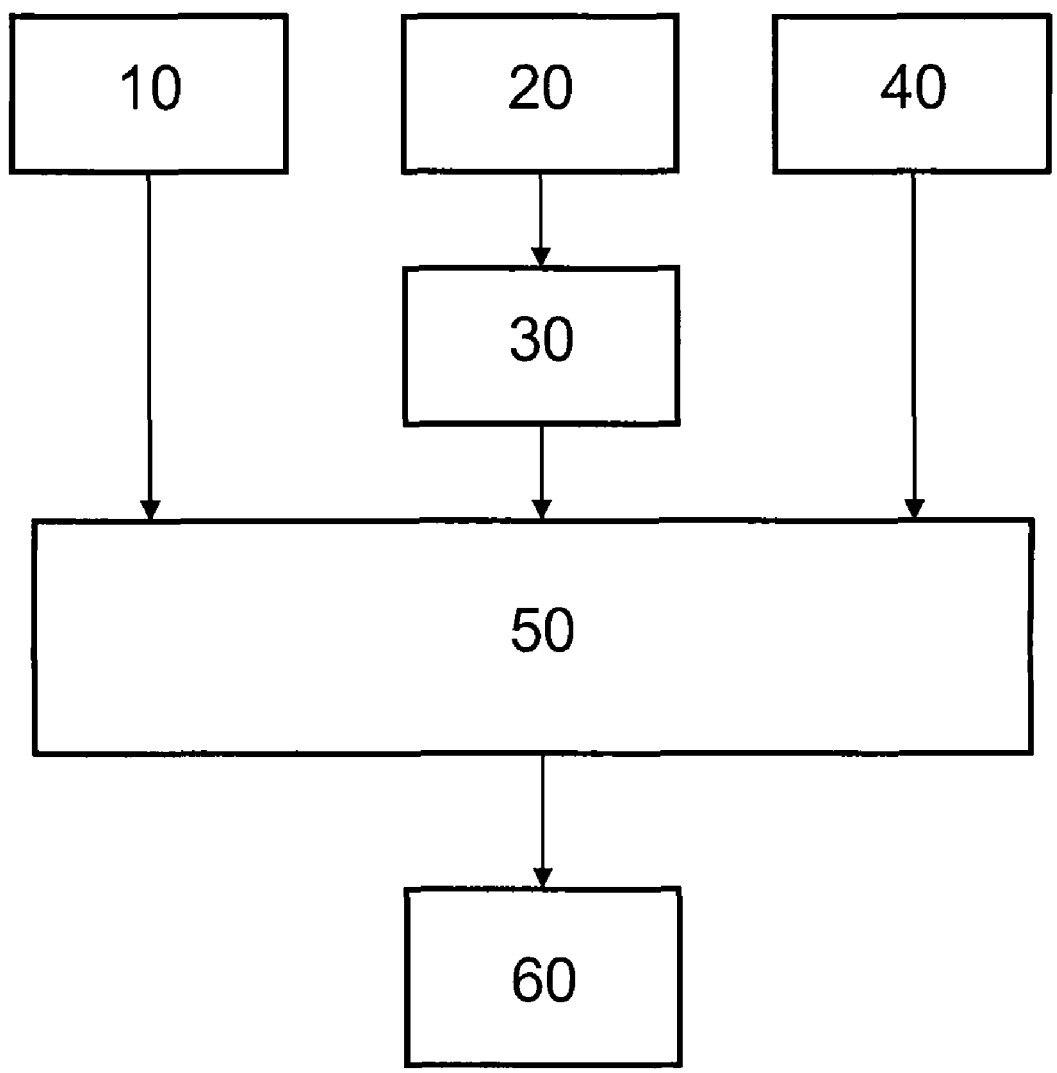
FIG. 4 shows a flow chart illustrating an embodiment of the method according to the invention.

To summarize, the method according to one aspect of the invention could be carried out as illustrated in FIG. 4:

In step 10, the resources of a cell are assigned cell specific resource priority weights (RPW), expressed e.g. as an indexing vector of integers representing the priority order for each resource. The same radio resources in at least one neighboring cell are assigned different resource priority weights.

Channel quality indication reports are created by measuring at step 20, the Signal to Interference plus Noise Ratio (SINR), and in step 30 converting said measured SINR value into an index value by means of e.g. mapping the measured value to a table of CQI indexing values.

In step 40, a restriction comprising one or several restriction rules is added to the calculation of WCQI in order to further define which resources that can be used under certain condition.

Either one of the RPW or the CQI values could be scaled with a factor in order to increase its impact in the calculation 50 of the weighted channel quality index (WCQI). The choice of scaling can e.g. depend on the cell layout of the network. For example, in an environment with a large number of cells overlapping each other, the inter-cell interference is probably a significant problem, and the impact of the RPW could be scaled to have a relatively large impact, whereas in a different environment, it is more advantageous to give the CQI a greater impact.

In step 60, the scheduler then selects resources in accordance with the calculated weighted channel quality index and any applied restriction rules.

Different resources may be allowed to be used with different power levels. There is nothing that prohibits the use of the present invention together with power limitations on the different resources.

The cell specific resource priority weights can be generated in a central node such as an operational maintenance node and provided to the different base stations (1, 2a-f) from said central node over an open interface. The cell specific resource priority weights can either be generated manually by means of a net planning instrument or automatically in a Radio Resource Management node (RRM) or the like.

The present invention is applicable to both uplink and downlink transmission. In case of uplink transmission the scheduler aims to assign resources with high resource priority weights to cell edge-users. The users are categorized into groups dependent on their geographic position in the cell, and are assigned resources of different priority classes. Such categorization into e.g. cell-edge users and cell-centre users could be based on geometry measurements. Cell-edge users are then assigned to resource with lower priority indexes than cell-centre users. The benefits of this are twofold:

Firstly, a user far from the receiving base station will often be power limited and it is then not able to increase the transmit power in case the interference increases. Hence the only way to improve the performance of this cell-edge user is to reduce the interference on the used resources. If resources with high resource priority weights in one cell are assigned low resource priority weights in an interfering cell there is a high probability that the corresponding resources will be unused in the interfering cell and thus the cell edge user will experience less inter-cell interference if it is assigned to resources with high resource priority weights.

Secondly, even if the resources assigned to a cell-edge user are used in a neighboring interfering cell they will often be assigned to users close to the base station in the other cell. Such cell-centre users typically have a much smaller path loss compared to cell-edge users and they can therefore often transmit with a power much lower than the maximum possible power. The cell centre-users also have a larger path loss to interfered base stations since they are typically located at a longer distance from interfered base stations. Because of this they will generate less interference for cell-edge users in the neighboring cells.

Also for the downlink it is beneficial to map resources transmitted with high power to resource with high resource priority weights. This ensures that a resource transmitted with low power from one base station will have a low probability of colliding with resources transmitted with high power from a neighboring interfering base station.

While the invention has been described in connection with what is presently considered to be the most practical and preferred embodiments, it is to be understood that the invention is not to be limited to the disclosed embodiments, but is intended to cover various modifications within the scope of the appended claims.

The invention claimed is:

1. A method in a scheduler for reducing inter-cell interference in a cellular radio system in which said scheduler controls a set of shared radio resources, comprising the steps of:
   assigning cell specific resource priority weights (RPW) to the different radio resources available in a cell, said assignment differs from the assignment of the same radio resources in at least one neighboring cell;
   combining the cell specific resource priority weights with channel quality indication reports (CQI) from the users to form weighted quality indexes (WCQI) for the radio resources that are available to the scheduler;
   utilizing the weighted quality indexes for selection of radio resources; and
   transmitting data from or receiving data at a base station associated with the first cell using the selected radio resources.

2. The method according to claim 1, comprising categorizing the radio resources of a cell into priority classes, where each class is represented by a priority class index.

3. The method according to claim 1, comprising categorizing users into groups dependent on their geographic position in the cell, and assigning resources of different priority classes to the users of the different groups.

4. The method according to claim 2 comprising categorizing the radio resources into priority classes denoted "preferred", "allowed" and "prohibited", where the "preferred" resources are used first, the "allowed" resources are used only when no more unused "preferred resources" exist, and the "prohibited" resources are never used.

5. The method according to claim 2, comprising creating a priority list according to which each priority class comprises only one resource.

6. The method according to claim 5, comprising assigning the lowest priority class index to a starting resource ($r_i$), said starting resource is different from starting resources in neighboring cells, and assigning raising priority class indexes to the resources following the starting resource according to the principle $r_i$, $r_i-1$, $r_i+1$, $r_i-2$, $r_i+2$, . . . from said starting resource.

7. The method according to claim 1, comprising creating the channel quality indication reports (CQI) by measuring the Signal to Noise Ratio (SNR) or the Signal to Interference plus Noise Ratio (SINR) and converting said measured value into an index value.

8. The method according to claim 1, comprising multiplying the CQI or the RPW with a scaling factor, said scaling factor determines the relative influence of the term with which it is multiplied in the calculation of the weighted channel quality index (WCQI).

9. The method according to claim 1, whereby the cell specific resource priority weights and/or the weighted quality index is combined with one or more usage limitation rules applied to some of radio resources under certain conditions.

10. The method according to claim 9, whereby the usage limitation rules may be cell specific and/or user specific and/or resource specific and/or time dependent.

11. The method according to claim 9, whereby resources with higher priority indexes may not be used before any resources with lower priority indexes.

12. The method according to claim 9, comprising applying said usage limitation rules as binary values, representing compliance or non-compliance with certain conditions, on the cell specific resource priority weights or the weighted channel quality index.

13. The method according to claim 12, whereby resources of certain priority may not be used unless the buffer fill ratio is above a predefined threshold, whereby resources of different priority may have different thresholds.

14. The method according to claim 12, whereby resources of certain priority may not be used unless the packet delay is above a predefined threshold, whereby resources of different priority may have different thresholds.

15. The method according to claim 12, whereby resources of certain priority may not be used unless a packet quality measurement such as packet error rate or packet drop rate is above a predefined threshold.

16. The method according to claim 12, whereby certain resources may be used only if load measurements in neighboring cells are all below (or above) a threshold.

17. The method according to claim 12, whereby certain resources may be used in a certain transmission time interval TTI only if the utilization of these resources is below a threshold.

18. The method according to claim 17, whereby resources of certain priority may only be used for a predetermined number $N_{max}$ of consecutive transmission time intervals TTI.

19. The method according to claim 17, whereby when resources of certain priority are used in a transmission time interval TTI (n), the same resource must not be used in transmission time interval number (n+$N_{RTT}$) where N is related to the HARQ round-trip time.

20. The method according to claim 17, whereby when used in a transmission time interval TTI (n) the transmitted power on resources of certain priority have increased more than a threshold over a pre-defined time interval, the same resources must not be used in transmission time interval number (n+$N_{RTT}$) where $N_{RTT}$ is related to the HARQ round-trip time.

21. The method according to claim 13, whereby as the threshold is exceeded, a timer is started whereby a corresponding set of resources is allowed to be used during the time set by the timer, whereby resources of certain priority may have its own timer value.

22. The method according to claim 13, whereby a restriction is combined with a hysteresis in the threshold values, whereby as the threshold is exceeded a corresponding set of resources is allowed to be used until a measurement falls below another threshold, which is preferably lower than the first threshold.

23. The method according to claim 9, whereby resources of certain priority may only be used by users with a certain classification or the resources are always scheduled to users of such classifications first if such users exist.

24. The method according to claim 9, whereby resources of certain priority may only be used by emergency calls or the resources are always scheduled first to emergency users if such users exist.

25. The method according to claim 1, whereby said scheduler is arranged in a base station, and whereby the scheduler receives said cell specific resource priority weights from a central node such as an operational maintenance node.

26. The method according to claim 1, whereby cell specific power limitations are assigned to different radio resources.

27. A scheduler capable of controlling a set of shared radio resources in a cellular radio system, the scheduler comprising:
means for assigning cell specific resource priority weights (RPW) to the different radio resources available in a cell, said assignment differs from the assignment of the same radio resources in at least one neighboring cell;
means for combining the cell specific resource priority weights with channel quality indication reports (CQI) from the users to form weighted quality indexes (WCQI) for the radio resources that are available to the scheduler;
means for utilizing the weighted quality indexes for selection of radio resources; and
means for transmitting data from or receiving data at a base station associated with the first cell using the selected radio resources.

28. A scheduler capable of controlling a set of shared radio resources in a cellular radio system, wherein the scheduler comprises:
means for assigning cell specific resource priority weights (RPW) to the different radio resources available in a cell, said assignment differs from the assignment of the same radio resources in at least one neighboring cell;
means for categorizing the radio resources into resource priority classes including "preferred," "allowed," and "prohibited" classes;
means for utilizing the resource priority classes for selection of radio resources, wherein resources of the "preferred" priority class are used first, resources of the "allowed" priority class are used only when no more unused resources of the "preferred" priority class exist, and resources of the "prohibited" priority class are never used; and
means for transmitting data from or receiving data at a base station associated with the first cell using the selected radio resources.

29. A method in a scheduler for reducing inter-cell interference in a cellular radio system in which said scheduler controls a set of shared radio resources, comprising the steps of:
assigning cell specific resource priority weights (RPW) to the different radio resources available in a cell, said assignment differs from the assignment of the same radio resources in at least one neighboring cell;
categorizing the radio resources into resource priority classes including "preferred", "allowed" and "prohibited" classes;
utilizing the resource priority classes for selection of radio resources, wherein resources of the "preferred" priority class are used first, resources of the "allowed" priority class are used only when no more unused resources of the "preferred" priority class exist, and resources of the "prohibited" priority class are never used; and
transmitting data from or receiving data at a base station associated with the first cell using the selected radio resources.

30. The method according to claim 29, further comprising categorizing users into groups dependent on their geographic position in the cell, and assigning resources of different priority classes to the users of the different groups.

31. The method according to claim 29, further comprising creating a priority list according to which each resource priority class comprises only one resource.

32. The method according to claim 29, wherein utilizing the resource priority classes for selection of radio resources comprises selecting radio resources based on the resource priority classes of the selected resources and classifications of user for which the resources are selected, wherein resources of one or more resource priority classes may only be used by users with a certain classification or resources of one or more resource priority classes are always scheduled for use by users of a particular classification first if such users exist.

33. The method according to claim 29, wherein utilizing the resource priority classes for selection of radio resources comprises selecting radio resources based on the resource priority classes of the selected resources and types of call to be made with the selected resources, wherein resources of one or more resource priority classes may only be used by emergency calls or resources of one or more resource priority classes are always scheduled first to emergency users if such users exist.

34. The method according to claim 29, whereby cell specific power limitations are assigned to different radio resources.

* * * * *